US006737773B2

(12) United States Patent
Hayashi et al.

(10) Patent No.: US 6,737,773 B2
(45) Date of Patent: May 18, 2004

(54) WIRING STRUCTURE OF MOTOR IN HYBRID COMPRESSOR

(75) Inventors: Hirohito Hayashi, Kariya (JP); Jiro Iwasa, Kariya (JP); Taku Adaniya, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 35 days.

(21) Appl. No.: 10/251,256

(22) Filed: Sep. 19, 2002

(65) Prior Publication Data

US 2003/0057790 A1 Mar. 27, 2003

(30) Foreign Application Priority Data

Sep. 19, 2001 (JP) ....................................... 2001-285410

(51) Int. Cl.[7] ............................ H02K 5/22; F04B 35/00
(52) U.S. Cl. .......................................... 310/71; 417/374
(58) Field of Search ................... 310/71, 113; 417/374, 417/222, 410.1; 62/236; 361/826; 174/68.1–68.2, 70 R, 96

(56) References Cited

U.S. PATENT DOCUMENTS

| | | | | |
|---|---|---|---|---|
| 6,617,727 B2 * | 9/2003 | Iwasa et al. | .............. | 310/75 R |
| 6,628,021 B2 * | 9/2003 | Shinohara et al. | ........ | 310/68 B |

FOREIGN PATENT DOCUMENTS

| | | |
|---|---|---|
| JP | 6-87678 | 12/1994 |
| JP | 2001-140757 | 5/2001 |

* cited by examiner

*Primary Examiner*—Burton S. Mullins
*Assistant Examiner*—J. Aguirrechea
(74) *Attorney, Agent, or Firm*—Morgan & Finnegan, LLP

(57) ABSTRACT

A conventional hybrid compressor compresses gas when power is transmitted from a vehicular drive source via a power transmission mechanism and when an electric motor, which is incorporated in the power transmission mechanism, is actuated. A motor wiring component extends from the electric motor to the outside of the power transmission mechanism. The motor wiring is provided with shape maintaining means for maintaining the shape.

17 Claims, 5 Drawing Sheets

WIRING STRUCTURE OF MOTOR IN HYBRID COMPRESSOR

BACKGROUND OF THE INVENTION

The present invention relates to a hybrid compressor that compresses gas when power is transmitted from a vehicular drive source to the compressor via a power transmission mechanism, which is supported by a housing assembly, and that also compresses gas when an electric motor, which is incorporated in the power transmission mechanism, is actuated. Particularly, the present invention pertains to a wiring structure from an electric motor to the outside of a power transmission mechanism.

Recently, idling stop system is becoming widely used to improve the fuel economy. The idling stop system stops the engine when a vehicle is stopped at stoplights. A hybrid type compressor, which is equipped with an electric motor, is disclosed in, for example, Japanese Laid-Open Patent Publication No. 2001-140757. The hybrid type compressor enables the air-conditioning of a passenger compartment while the engine is not running.

In the above publication, a power transmission mechanism is supported by a housing assembly of the compressor. The power transmission mechanism has a rotor, about which a belt from the engine is wound. Power is transmitted from the engine to the rotor by the belt, thereby actuating the compressor. An electric motor is incorporated in the power transmission mechanism for actuating the compressor when the engine is stopped.

However, in general, the electric motor is wired to the outside of the power transmission mechanism using a lead wire, which is flexible and does not maintain the shape. Thus, the handling of the lead wire is troublesome, which reduces the work efficiency. Also, a large space is required in the vicinity of the lead wire so that the lead wire does not interfere with a rotating portion of the power transmission mechanism. This increases the size of the power transmission mechanism, which results in the increase of the compressor size.

SUMMARY OF THE INVENTION

Accordingly, it is an objective of the present invention to provide a wiring structure of a motor in a hybrid compressor that improves the work efficiency of the wiring procedure for the electric motor and reduces the space for motor wiring.

To achieve the above objective, the present invention provides a wiring structure of an electric motor in a hybrid compressor. When power is transmitted from a vehicular drive source via a power transmission mechanism, the hybrid compressor compresses gas. When the electric motor incorporated in the power transmission mechanism is actuated, the hybrid compressor also compresses gas. The wiring structure includes a housing, a motor wiring component, and shape maintaining means. The housing supports the power transmission mechanism. The motor wiring component has a shape and extends from the electric motor to the outside of the power transmission mechanism and the housing. The shape maintaining means maintains the shape of the motor wiring component.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(*b*) is a front view of the bus bar shown in FIG. 3(*a*);

FIG. 4(*b*) is a front view of the first motor wiring component shown in FIG. 4(*a*);

FIG. 5(*b*) is a front view of the second motor wiring component shown in FIG. 5(*a*);

DETAILED DESCRIPTION OF THE PREFERRED EMBODIMENTS

A first embodiment of the present invention will now be described.

Figure 1:
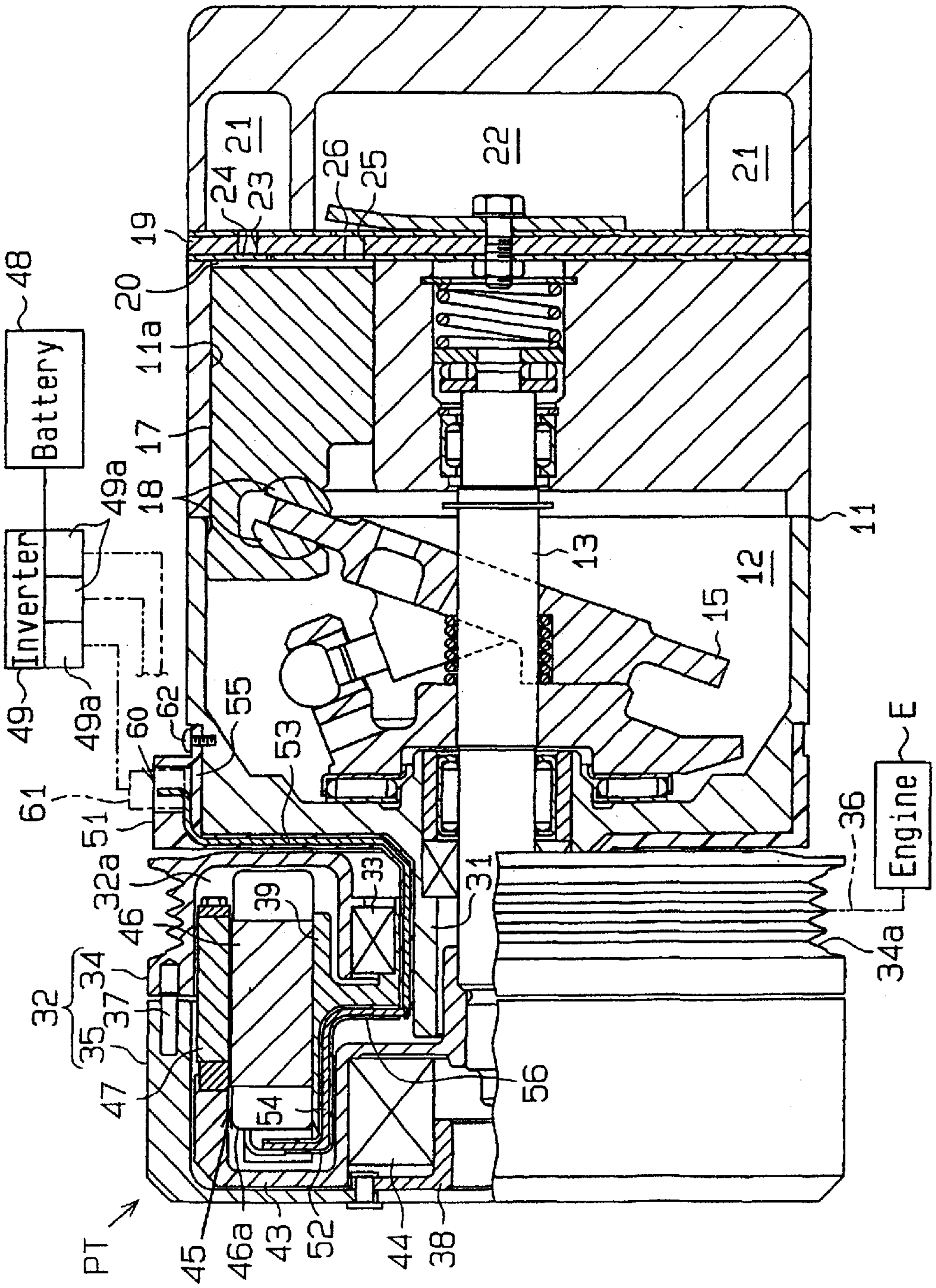
FIG. 1 is a cross-sectional view illustrating a hybrid compressor according to a preferred embodiment of the present invention.

As shown in FIG. 1, a hybrid compressor (hereinafter, simply referred to as a compressor) has a housing assembly 11. A crank chamber 12 is defined in the housing assembly 11. A drive shaft 13 is rotatably supported by the housing assembly 11. The drive shaft 13 is coupled to and driven by an output shaft of a vehicular drive source, which is an internal combustion engine E in this embodiment, via a power transmission mechanism PT. A swash plate 15 is coupled to the drive shaft 13 and is located in the crank chamber 12. The swash plate 15 rotates integrally with the drive shaft 13.

The housing assembly 11 has cylinder bores 11*a* (only one is shown). Each cylinder bore 11*a* accommodates a single-headed piston 17. Each piston 17 reciprocates inside the corresponding cylinder bore 11*a*. Each piston 17 is coupled to the peripheral portion of the swash plate 15 by a pair of shoes 18. The shoes 18 convert the rotation of the swash plate 15, which rotates with the drive shaft 13, to reciprocation of the pistons 17.

A compression chamber 20 is defined in the rear side (right side as viewed in the drawing) of each cylinder bore 11*a* by the associated piston 17 and the valve plate assembly 19. The housing assembly 11 defines a suction chamber 21 and a discharge chamber 22 opposite to the cylinder bores 11*a* with the valve plate assembly 19 arranged in between. The valve plate assembly 19 has suction ports 23, suction valve flaps 24, discharge ports 25 and discharge valve flaps 26. Each set of the suction port 23, the suction valve flap 24, the discharge port 25 and the discharge valve flap 26 corresponds to one of the cylinder bores 11*a*.

As each piston 17 moves from the top dead center to the bottom dead center, refrigerant gas in the suction chamber 21 is drawn into the corresponding compression chamber 20 through the corresponding suction port 23 while flexing the suction valve flap 24 to an open position. Refrigerant gas that is drawn into the compression chamber 20 is compressed to a predetermined pressure as the piston 17 is moved from the bottom dead center to the top dead center. Then, the gas is discharged to the discharge chamber 22 through the corresponding discharge port 25 while flexing the discharge valve flap 26 to an open position.

Figure 2:
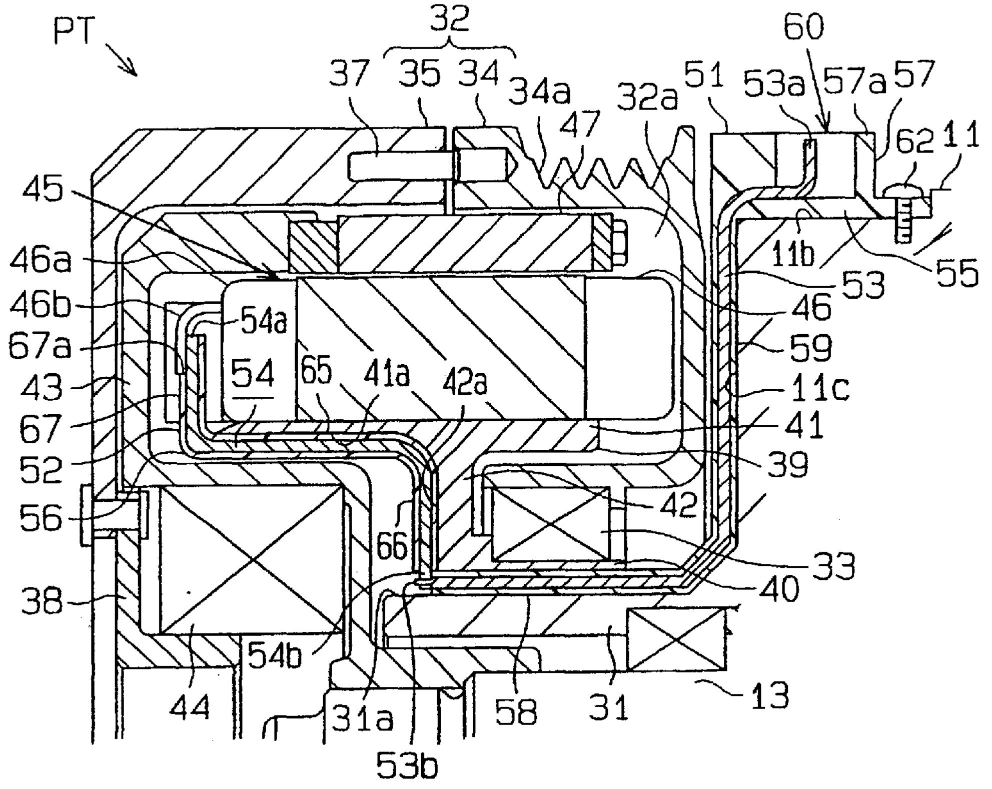
FIG. 2 is an enlarged partial cross-sectional view of the compressor shown in FIG. 1.

As shown in FIGS. 1 and 2, a boss 31 protrudes from an end surface 11*c*, which is at the front side (left side as viewed in the drawings) of the housing assembly 11. The boss 31 surrounds the front portion of the drive shaft 13. A rotary body 32 is rotatably supported by the outer circumference of the boss 31 with a bearing 33. The rotary body 32 includes a rotor 34, which is arranged on the side close to the housing assembly 11, and a cylindrical cover 35, which is arranged in front of the rotor 34. The rotor 34 and the cover 35 form a casing, which defines an accommodating chamber 32*a*.

The inner circumferential portion of the rotor 34 is fitted to the outer ring of the bearing 33. A belt support 34*a* is formed on the outer circumferential portion of the rotor 34. A belt 36 is engaged with the belt support 34*a* to transmit power from the engine E. The cover 35 is secured to the outer circumferential edge of the rotor 34 by connecting pins 37 (only one shown). A hub 38 is secured to the inner circumferential portion of the cover 35 and located inside the accommodating chamber 32*a*.

A stationary bracket 39 is arranged on the outer circumferential side of the boss 31 and located inside the accommodating chamber 32*a*. As shown in FIG. 2, the stationary bracket 39 includes a cylindrical mounting portion 40, a cylindrical support 41, and a disk-shaped coupler 42. The mounting portion 40 is arranged between the boss 31 and the bearing 33. The support 41 is arranged on the outer circumferential side of the mounting portion 40. The support 41 is longer than the mounting portion 40 and extends toward the front side as compared to the mounting portion 40. The coupler 42 couples the front end of the mounting portion 40 and the substantially middle portion of the support 41.

A disk-shaped rotary bracket 43 is secured to the front end of the drive shaft 13 and located inside the accommodating chamber 32*a*. The rotary bracket 43 is located in front of the stationary bracket 39. The outer circumferential portion of the rotary bracket 43 protrudes forward to avoid contacting the stationary bracket 39. A one-way clutch 44 is located between the inner circumferential portion of the rotary bracket 43 and the hub 38. Therefore, the rotary body 32 is operably coupled to the drive shaft 13 by the one-way clutch 44.

An electric motor, which is a motor 45 in this embodiment, is located in the accommodating chamber 32*a*. The motor 45 includes a stator 46, which is secured to the support 41 of the stationary bracket 39, and a rotary element 47, which is arranged to surround the stator 46 and secured to the outer circumference of the rotary bracket 43.

The stator 46 has coils 46*a*, the number of which is three in this embodiment (only one shown). An inverter 49 is located in a supply passage between the coils 46*a* and a direct-current power source, which is a battery 48 in this embodiment. The inverter 49 includes phase inverter circuits 49*a*, the number of which is three in this embodiment corresponding to the number of the coils 46*a*. The alternating-current output terminal of each phase inverter circuit 49*a* is electrically connected to one of the coils 46*a*.

A controller, which is not shown, controls the inverter 49 to generate a pseudo three-phase alternating voltage, which is then applied to the stator 46. When the voltage is applied to the stator 46, the rotary element 47 is rotated integrally with the rotary bracket 43 and the drive shaft 13 to actuate the compressor. Thus, the air in the passenger compartment is conditioned even when the engine E is stopped. The one-way clutch 44 prevents the power from being transmitted from the rotary bracket 43 to the hub 38. Thus, the rotational force generated by the motor 45 is not transmitted to the engine E unnecessarily.

The one-way clutch 44 permits the power transmission from the hub 38 to the rotary bracket 43. Therefore, when the engine E is running, the power is transmitted from the engine E to the drive shaft 13 via the rotary body 32, the hub 38, the one-way clutch 44, and the rotary bracket 43, thereby actuating the compressor.

The wiring structure of a motor will now be described.

As shown in FIG. 2, the stator 46 of the motor 45 is wired to the outside of the power transmission mechanism PT by using first and second motor wiring components 51 and 52. The first motor wiring component 51 includes conductors, which are plate-like bus bars 53 in this embodiment. The second motor wiring component 52 includes conductors, which are plate-like bus bars 54 in this embodiment. The bus bars 53, 54 are covered with resin members 55, 56 such as unsaturated polyester, respectively. The resin mold is applied to the bus bars 53, 54 by insert molding. The molded resin member 55, 56 of each motor wiring component 51, 52 is substantially cylindrical, or more specifically, a combination of a cylindrical body and a disk-shaped body.

Figure 4A:
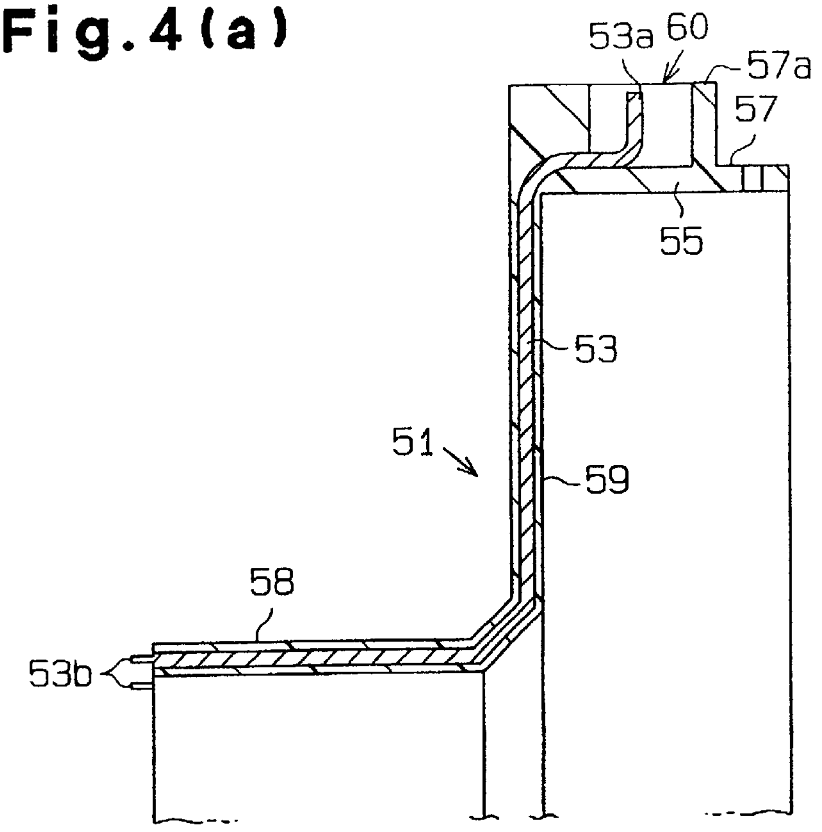
FIG. 4(*a*) is a cross-sectional view of a first motor wiring component.
Figure 4B:
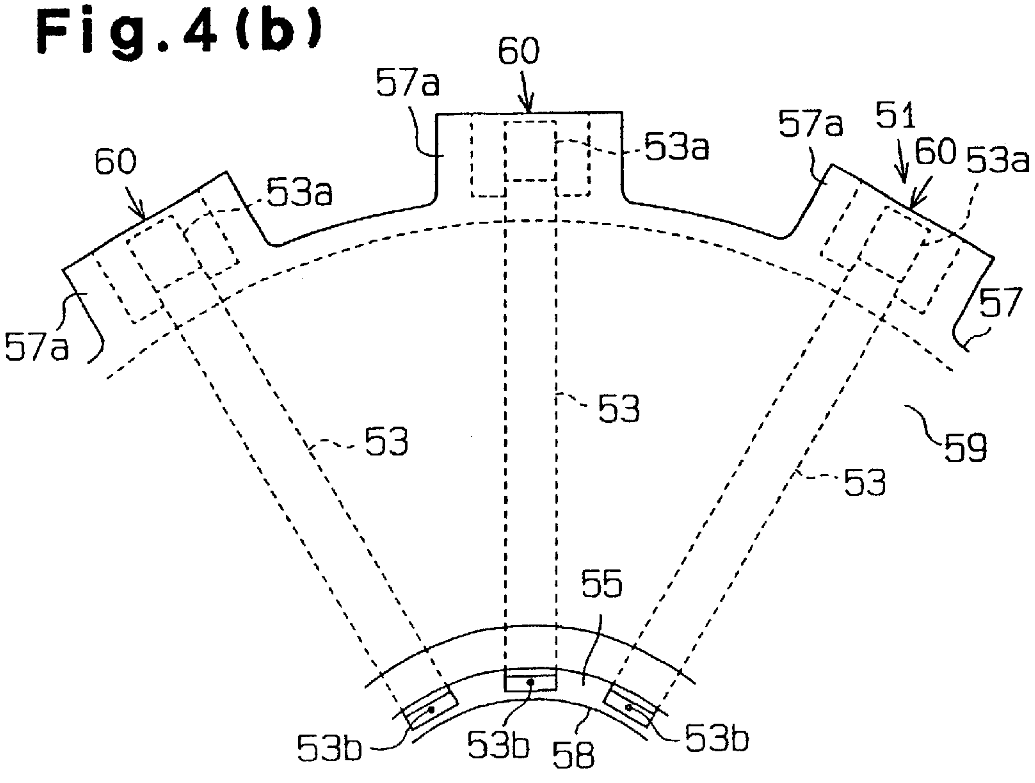

As shown in FIGS. 4(*b*) and 5(*b*), the number of bus bars 53 or 54 of the corresponding one of the first and the second motor wiring components 51, 52 corresponds to the number of the coils 46*a* (three in this embodiment) of the stator 46. The bus bars 53 are integrated while keeping insulation by the molded resin member 55. The bus bars 54 are integrated while keeping insulation by the molded resin member 56. The phase inverter circuit 49*a* of the inverter 49 is electrically connected to the coils 46*a* of the stator 46 with the bus bars 53 of the first motor wiring component 51 and the bus bars 54 of the second motor wiring component 52 (see FIG. 1).

The bus bars 53, 54, which are used for the first and the second motor wiring components 51, 52, have more rigidity and more reliably maintain the shape than lead wires. Furthermore, the molded resin members 55, 56 help maintaining the shape. That is, each of the first and the second motor wiring components 51, 52 is provided with two types of shape maintaining means for reliably maintaining the shape.

As shown in FIGS. 2, 4(*a*), and 4(*b*), the first motor wiring component 51 includes a thin cylindrical large diameter portion 57, a thin cylindrical small diameter portion 58, and a thin disk-shaped coupling portion 59. The large diameter portion 57 is fitted to a cylindrical outer circumferential surface 11*b* at the front end of the housing assembly 11. The small diameter portion 58 is fitted to a cylindrical outer circumferential surface 31*a* of the boss 31 and arranged between the boss 31 and the bearing 33. The coupling portion 59 extends along the front end surface 11*c* of the housing assembly 11 and couples the large diameter portion 57 with the small diameter portion 58. The first motor wiring component 51 is secured to the housing assembly 11 by a bolt 62 at the large diameter portion 57. Therefore, the first motor wiring component 51 covers and is arranged tightly in contact with the outer circumferential surface 11*b*, the front end surface 11*c*, and the outer circumferential surface 31*a* of the housing assembly 11.

Each bus bar 53 of the first motor wiring component 51 extends along the inside of the large diameter portion 57, the coupling portion 59, and the small diameter portion 58. Each bus bar 53 is bent along the outer circumferential surface 11*b*, the front end surface 11*c*, and the outer circumferential surface 31*a* of the boss 31 such that the cross-section of each bus bar 53 is substantially L-shaped.

Figure 3A:
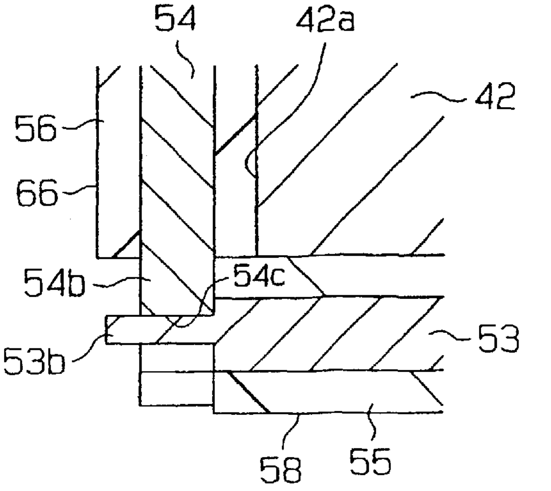
FIG. 3(*a*) is an enlarged partial cross-sectional view of the compressor shown in FIG. 2.
Figure 3B:
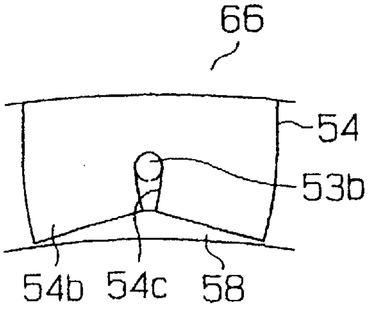

Protrusions 57*a* (three in this embodiment) are formed on the outer circumferential surface of the large diameter portion 57 of the first motor wiring component 51. A first end 53*a* of each bus bar 53 is arranged inside one of the protrusions 57*a*. The first end 53*a* of each bus bar 53 and the corresponding protrusion 57*a* structure a connector 60 of the motor 45. The connector 60 is connected to a connector 61, which extends from the phase inverter circuit 49*a* (see FIG. 1). As shown in FIGS. 3(*a*) and 3(*b*), a second end 53*b* of each bus bar 53 is pin shaped. Each second end 53*b* projects from the front end of the small diameter portion 58 and is exposed from the molded resin member 55.

The first motor wiring component 51 is mounted to the housing assembly 11 before the power transmission mechanism PT is mounted. Thus, when the power transmission mechanism PT is mounted to the housing assembly 11, the tightening force of the bearing 33 to the boss 31 secures the small diameter portion 58 of the first motor wiring component 51 to the outer circumferential surface 31*a* of the boss 31.

Figure 5A:
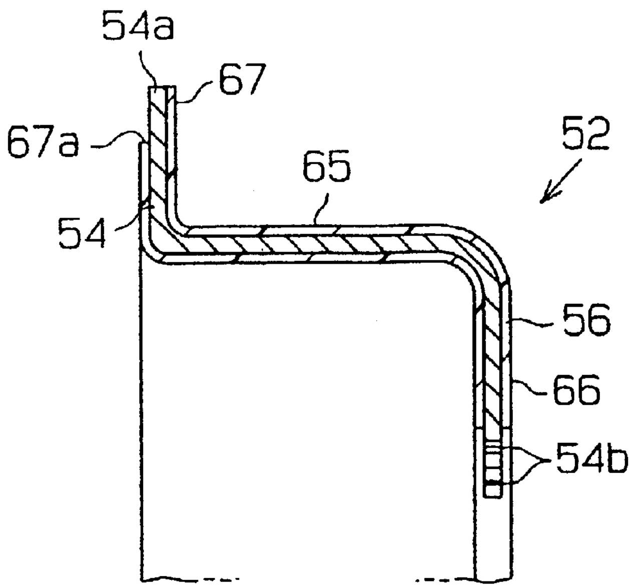
FIG. 5(*a*) is a cross-sectional view of a second motor wiring component.
Figure 5B:
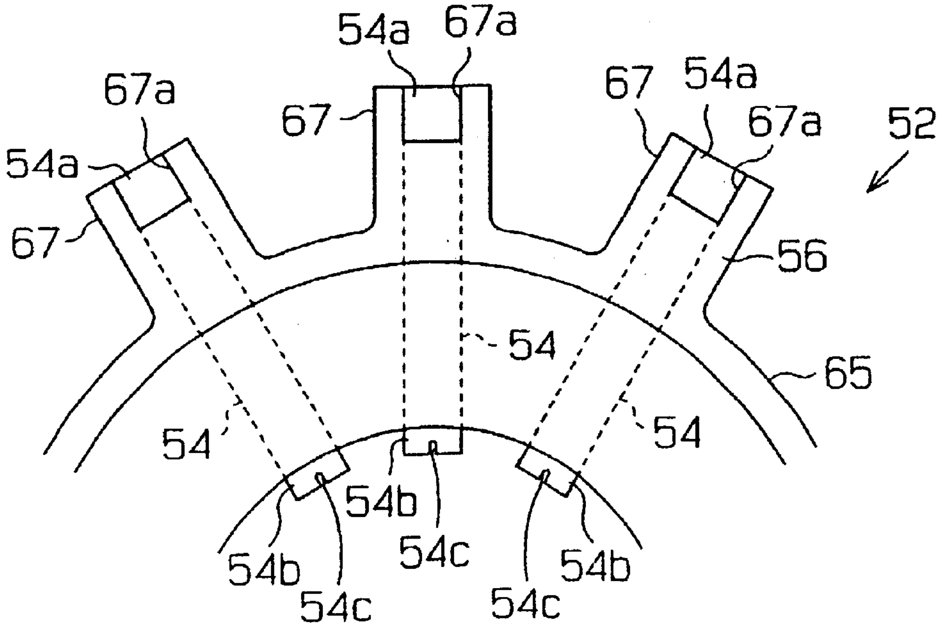

As shown in FIGS. 2, 5(*a*), 5(*b*), the second motor wiring component 52 includes a thin cylindrical portion 65 and a thin disk-shaped ring 66. The cylindrical portion 65 is secured to and is tightly in contact with the front side of a cylindrical inner circumferential surface 41*a* of the support 41. The ring 66 extends radially inward from the rear end edge of the cylindrical portion 65. The ring 66 extends along the front wall 42*a* of the coupler 42 of the stationary bracket 39. That is, the second motor wiring component 52 is arranged to cover the inner circumferential surface 41*a* and the front wall 42*a*, which are located at the front side, and is secured by an adhesive or bolts, which are not shown.

Each bus bar 54 of the second motor wiring component 52 extends inside the cylindrical portion 65 and the ring 66. Therefore, the second motor wiring component 52 is L-shaped along the inner circumferential surface 41*a* and the front wall 42*a*, which are located at the front side of the stationary bracket 39.

Connecting portions 67 (three in this embodiment) extend radially outward from the front end edge of the cylindrical portion 65 of the second motor wiring component 52. Each connecting portion 67 has a cutaway portion 67*a* on the front surface. Each bus bar 54 is located inside the connecting portion 67. A first end 54*a* of each bus bar 54 is exposed from the molded resin member 56 through the corresponding cutaway portion 67*a*. An end portion 46*b* of each coil 46*a* of the stator 46 is welded to the exposed portion of one of the first ends 54*a*.

As shown in FIGS. 3(*a*) and 3(*b*), the second end 54*b* of each bus bar 54 extends radially inward from the distal end of the ring 66 and is exposed from the molded resin member 56. The second end 54*b* of each bus bar 54 has a slit 54*c*. The second end 53*b* of the bus bar 53 of the first motor wiring component 51 is inserted into and engaged with or caulked to the slit 54*c*. Therefore, the electricity is conducted between the connector 60 and the coils 46*a* of the stator 46 by the bus bars 53 of the first motor wiring component 51 and the bus bars 54 of the second motor wiring component 52. Although not shown, the engaging portion between the second ends 53*b*, 54*b* of the bus bars 53, 54 is preferably coated with resin mold to maintain insulation and waterproof.

The second motor wiring component 52 is secured to and tightly in contact with an assembly of the bearing 33, the rotor 34, the stationary bracket 39, and the stator 46. The second motor wiring component 52 is then mounted to the compressor with the assembly. In this state, the second motor wiring component 52 is connected to the first motor wiring component 51 by the bus bars 53, 54 (second ends 53*b*, 54*b*). Then, the rotary bracket 43, to which the rotary element 47 is secured, is secured to the drive shaft 13. Then, an assembly of the cover 35, the hub 38, and the one-way clutch 44 is mounted to the rotor 34 to close the front opening.

The present embodiment provides the following advantages.

(1) The first and the second motor wiring components 51, 52 reliably maintain the shape by the shape maintaining means, which includes bus bars 53, 54 and resin members 55, 56. Therefore, the handling of the first and the second motor wiring components 51, 52 is easy when wiring for the motor 45. This improves the work efficiency of wiring. Thus, the wiring procedure, which has been manually performed with the conventional lead wires, can be automated. If the wiring procedure is automated, the productivity of the compressor is significantly improved. That reduces the cost of the compressor. Also, the first and the second motor wiring components 51, 52 do not easily deform. Thus, it is not required to provide a large space for preventing the first and the second motor wiring components 51, 52 from interfering with the rotating portion of the power transmission mechanism PT. Therefore, the first and the second motor wiring components 51, 52 are arranged in a small space, which reduces the size of the power transmission mechanism PT, or the compressor.

(2) The first and the second motor wiring components 51, 52 reliably maintain their shape by using the bus bars 53, 54 as conductors. Therefore, the shape of the end portions (the first ends 53*a*, 54*a* and second ends 53*b*, 54*b*), which are exposed from the molded resin members 55, 56, is maintained. Thus, the second end 53*b* of each bus bar 53 is stably connected to the second end 54*b* of the corresponding bus bar 54 and the first end 54*a* of each bus bar 54 is stably connected to the end portion 46*b* of one of the coils 46*a*. The number of parts is reduced by using the first end 53*a* as a terminal of the connector 60. The plate-like bus bars 53, 54 (having a rectangular cross-section) efficiently use space as compared to the case in which conductors having circular cross-section are used. This further reduces the space used for the first and the second motor wiring components 51, 52 and in the vicinity of the power transmission mechanism PT. As a result, the size of the compressor is reduced.

(3) Applying resin mold to the conductors 53, 54 reliably maintains the shape of the first and the second motor wiring components 51, 52. The molded resin members 55, 56 provide insulation and water-proof to the conductors 53, 54. Thus, it is not required to provide resin coating dedicated for insulation or water-proof. Thus, the wiring structure of the motor is provided at low cost.

(4) Two types of shape maintaining means are used to reliably maintain the shape of the first and the second motor wiring components 51, 52. The shape maintaining means are the bus bars 53, 54, which are used as conductors, and the resin mold applied to the conductors 53, 54. Thus, the advantage (1) is more effectively provided.

(5) The protrusion 57*a* of the connector 60, to which the connector 61 of the phase inverter circuit 49*a* is connected, is integrally formed with the molded resin member 55 of the first motor wiring component 51. This reduces the cost of the wiring structure of the motor as compared to the case where, for example, the protrusion 57*a* of the connector 60 is separate from the molded resin member 55.

(6) The first and the second motor wiring components 51, 52 are structured by integrating the bus bars 53, 54 with the molded resin member 55, 56, respectively. Therefore, the wiring procedure is more efficiently performed as compared to the case where each of the bus bars 53, 54 is molded by resin and mounted to the compressor separately.

(7) The first and the second motor wiring components 51, 52 are cylindrical. The first motor wiring component 51 is arranged tightly in contact with the outer circumferential surface 11*b* of the housing assembly 11 and the outer circumferential surface 31*a* of the power transmission mechanism PT. The second motor wiring component 52 is arranged tightly in contact with the outer circumferential surface 41*a* of the power transmission mechanism PT. Therefore, the first and the second motor wiring components 51, 52 are arranged in a small space, which reduces the size of the compressor. Also, the first and the second motor wiring components 51, 52 are easily mounted to the housing assembly 11 and the power transmission mechanism PT by only fitting the first and the second motor wiring components 51, 52 to the cylindrical surfaces 11*b*, 31*a*, 41*a*.

Further, the rigidity of the first and the second motor wiring components 51, 52 are improved because the molded resin members 55, 56 are cylindrical. Therefore, the molded resin members 55, 56 of the first and the second motor wiring components 51, 52 can be thin at the mounting portion 40, the support 41, and the coupler 42 of the stationary bracket 39, and the cylindrical portion 65, the ring 66, and the connecting portions 67 of the second motor wiring component 52. Thus, the shape is maintained and the space is reduced at the same time.

(8) The motor wiring includes the first motor wiring component 51, which is located outside of the power transmission mechanism PT, and the second motor wiring component 52, which is located close to the motor 45. The first motor wiring component 51 is connected to the second motor wiring component 52 inside the power transmission mechanism PT. Therefore, the joint between the first motor wiring component 51 and the second motor wiring component 52 is located inside the power transmission mechanism PT. Thus, the motor wiring does not hinder the flexibility of the design of the housing assembly 11 and the power transmission mechanism PT. That is, in the state shown in FIG. 2, the bearing 33 and the stationary bracket 39 can not be fitted to the small diameter portion 58 without dividing the motor wiring (the first and second motor wiring components 51, 52). Thus, in the case the motor wiring is not divided, the housing assembly 11 and the power transmission mechanism PT cannot be designed as shown in FIG. 2.

It should be apparent to those skilled in the art that the present invention may be embodied in many other specific forms without departing from the spirit or scope of the invention. Particularly, it should be understood that the invention may be embodied in the following forms.

In the preferred embodiment, the bus bars 53 of the first motor wiring component 51 and the bus bars 54 of the second motor wiring component 52 are secured by engaging the second ends 53*b* of the first motor wiring component 51 with the second ends 54*b* of the second motor wiring component 52. However, the second ends 53*b*, 54*b* may be secured to each other by using bolts.

Figure 6:
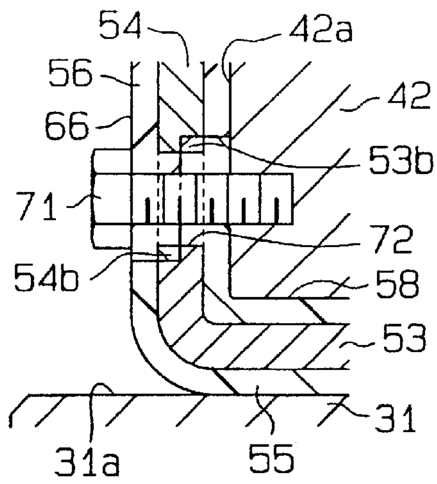
FIG. 6 is an enlarged partial cross-sectional view of a modified embodiment.

In this case, since the second ends 53*b*, 54*b* of the bus bars 53, 54 are thin, each second end 53*b* overlaps one of the second ends 54*b* as shown in FIG. 6. A through hole 72 is formed through each overlapping portion and a bolt 71 is inserted in the through hole 72. The distal end of the bolt 71 is screwed to the coupler 42 of the stationary bracket 39 so that the second ends 53*b*, 54*b* are secured with each other. The inner circumferential surface of each through hole 72 is coated by the molded resin members 55, 56. This maintains insulation between the bus bars 53, 54 and the bolt 71.

The bolt 71 also secures the second motor wiring component 52 to the stationary bracket 39. Therefore, the second ends 53*b*, 54*b* are secured at the same time as the second motor wiring component 52 is secured to the stationary bracket 39. This improves the wiring efficiency.

The second ends 53*b* of the bus bars 53 of the first motor wiring component 51 and the second ends 54*b* of the bus bars 54 of the second motor wiring component 52 may be secured by soldering or welding. In this case, Tungsten Inert-Gas arc welding or laser welding is suitable.

The first motor wiring component 51 and the second motor wiring component 52 may be connected with connectors. That is, fitting portions may be formed integrally with the molded resin member 55 at the small diameter portion 58 of the first motor wiring component 51. Each fitting portion and the second end 53*b* of each bus bar 53 structure a connector. Also, fitting portions may be formed integrally with the molded resin member 56 at the ring 66 of the second motor wiring component 52. Each fitting portion and the second end 54*b* of each bus bar 54 constitute a connector, which is connected to one of the connectors of the first motor wiring component 51. In this case, the second ends 53*b*, 54*b* of the bus bars 53, 54 are easily secured to each other.

Figure 7:
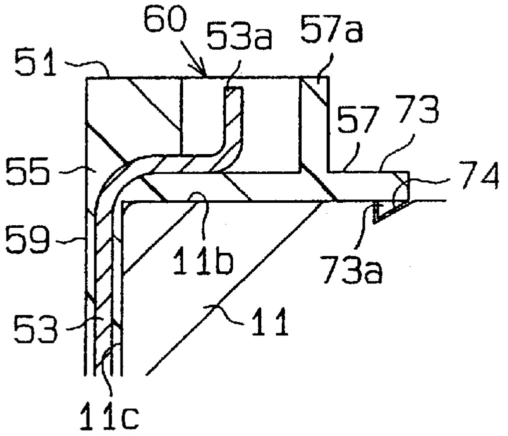
FIG. 7 is an enlarged partial cross-sectional view of another modified embodiment.

In the above embodiment, the large diameter portion 57 of the first motor wiring component 51 is secured to the housing assembly 11 by bolts. However, as shown in FIG. 7, the large diameter portion 57 may be snap-fitted to the housing assembly 11. FIG. 7 shows a flexible engaging piece 73 arranged on the large diameter portion 57. An engaging projection 73*a* is formed on the engaging piece 73. An engaging recess 74 is formed in the outer circumferential surface 11*b* of the housing assembly 11. The engaging projection 73*a* is engaged with the engaging recess 74. In this case, the first motor wiring component 51 is mounted to the housing assembly 11 by a simple procedure of only inserting the first motor wiring component 51 to the housing assembly 11. The second motor wiring component 52 may also be snap-fitted to the stationary bracket 39.

The first motor wiring component 51 may be secured to the housing assembly 11 (including the boss 31) by an adhesive.

Figure 8:
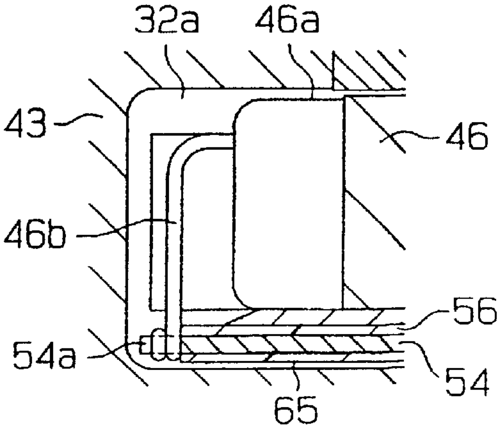
FIG. 8 is an enlarged partial cross-sectional view of another further embodiment.

In the above embodiment, the end portion 46*b* of each coil 46*a* of the stator 46 and the first end 54*a* of one of the bus bars 54 of the second motor wiring component 52 is connected by welding. However, as shown in FIG. 8, the connecting portion 67 may be eliminated from the second motor wiring component 52. In this case, the end portion 46*b* of each coil 46*a* is wound about and secured to the first end 54*a* of the corresponding bus bar 54.

The bus bars 53, 54 may be round rods. That is, the bus bars need not have rectangular cross-sections. Rods having circular cross-sections are included in the bus bars of this specification as long as the rods maintain the shape.

In the above embodiment, two types of shape maintaining means are provided for each of the first and second motor wiring components 51, 52. However, only one type of shape maintaining means may be provided. For example, the molded resin members 55, 56 may be eliminated from the first and the second motor wiring components 51, 52, or conductors like lead wires may be used. In the case when the molded resin members 55, 56 are eliminated, a resin coating (that does not maintain the shape) such as the one used for lead wires may be applied for insulation and water-proof. In the case when conductors like lead wires are used, the shape of the end of each lead wire that corresponds to the first end 53*a* of each bus bar 53 can not be maintained. Thus, a separate rigid conductor, which structures the terminal of the connector 60, is required.

In the above embodiment, the motor wiring has a block construction including the first motor wiring component 51, which is located outside of the power transmission mechanism PT, and the second motor wiring component 52, which is located close to the motor 45. That is, the first motor wiring component 51 and the second motor wiring component 52 are two separated blocks. However, the motor wiring component may be one unit extending from the motor 45 to the outside of the power transmission mechanism PT (connector 60).

In the above embodiment, the second motor wiring component 52 may be eliminated. In this case, the second end 53*b* of each bus bar 53 of the first motor wiring component 51 is connected to the end portion 46*b* of one of the coils 46*a* of the stator 46 by using lead wire. Since a part of the motor wiring (the first motor wiring component 51) maintains shape, the wiring is efficiently performed as compared to when lead wires are entirely used.

Therefore, the present examples and embodiments are to be considered as illustrative and not restrictive and the invention is not to be limited to the details given herein, but may be modified within the scope and equivalence of the appended claims.

What is claimed is:

1. A wiring structure of an electric motor in a hybrid compressor, wherein, when power is transmitted from a vehicular drive source via a power transmission mechanism, the hybrid compressor compresses gas, and wherein, when the electric motor incorporated in the power transmission mechanism is actuated, the hybrid compressor also compresses gas, the wiring structure comprising:

a housing for supporting the power transmission mechanism;

a motor wiring component having a shape and extending from the electric motor to the outside of the power transmission mechanism and the housing; and shape maintaining means for maintaining the shape of the motor wiring component.

2. The wiring structure according to claim 1, wherein the shape maintaining means includes a bus bar, wherein the bus bar functions as a conductor forming the motor wiring component.

3. The wiring structure according to claim 2, wherein the shape maintaining means includes a molded resin member, wherein the molded resin member covers the conductor forming the motor wiring component.

4. The wiring structure according to claim 3, wherein a connector is integrally formed with the molded resin member.

5. The wiring structure according to claim 3, wherein the motor wiring component is snap-fitted to at least one of the housing and the power transmission mechanism via the molded resin member.

6. The wiring structure according to claim 2, wherein the motor wiring component is one of a plurality of motor wiring components extending from the electric motor, wherein each motor wiring component includes a conductor, wherein the conductors are insulated from one another by molded resin members, and wherein each conductor is integrated with the corresponding molded resin member.

7. The wiring structure according to claim 6, wherein the molded resin members are formed cylindrical, wherein at least one of the molded resin members is arranged tightly in contact with the cylindrical surface of at least one of the housing and the power transmission mechanism.

8. The wiring structure according to claim 2, wherein the motor wiring component is a first motor wiring component, and the wiring structure further comprising a second motor wiring component, wherein the first motor wiring component is connected to the second motor wiring component, wherein the first motor wiring component is located outside of the power transmission mechanism, and the second motor wiring component is located close to the motor.

9. The wiring structure according to claim 8, wherein a joint between the first motor wiring component and the second motor wiring component is located inside the power transmission mechanism.

10. The wiring structure according to claim 2, wherein the bus bar has a rectangular cross-section.

11. A motor wiring component for a hybrid compressor, wherein, when power is transmitted from a vehicular drive source via a power transmission mechanism, which is supported by the housing, the hybrid compressor compresses gas, and wherein, when an electric motor incorporated in the power transmission mechanism is actuated, the hybrid compressor also compresses gas, the motor wiring component comprising:

a conductor; and a molded resin member for covering the conductor, wherein the molded resin member is formed cylindrical thereby corresponding to shapes of the housing and the power transmission mechanism.

12. The motor wiring component according to claim 11, wherein the conductor includes a bus bar.

13. The motor wiring component according to claim 11, wherein a connector is integrally formed with the molded resin member.

14. The motor wiring component according to claim 11, wherein the conductor is one of a plurality of conductors and the molded resin member is one of a plurality of molded resin members, wherein each conductor is integrally formed with one of the molded resin members such that the conductors are insulated from one another.

15. The motor wiring component according to claim 11, wherein the motor wiring component includes a first motor wiring component and a second motor wiring component, wherein the first motor wiring component is located outside of the power transmission mechanism, and the second motor wiring component is located close to the motor.

16. The motor wiring component according to claim 12, wherein the bus bar has a rectangular cross-section.

17. The motor wiring component according to claim 11, wherein the motor wiring component is snap-fitted to at least one of the housing and the power transmission mechanism via the molded resin member.

* * * * *